Oct. 9, 1956 G. C. BARKER 2,766,423

POLAROGRAPHS

Filed Sept. 8, 1952 5 Sheets-Sheet 1

GEOFFREY CECIL BARKER, Inventor

By Robert B. Larson

Attorney

Inventor
GEOFFREY CECIL BARKER,
By
[signature]
Attorney

Inventor
GEOFFREY CECIL BARKER,
By
[signature]
Attorney

Inventor
GEOFFREY CECIL BARKER,
By Robert [signature]
Attorney

GEOFFREY CECIL BARKER, Inventor
By [signature]
Attorney

United States Patent Office 2,766,423

Patented Oct. 9, 1956

2,766,423

POLAROGRAPHS

Geoffrey Cecil Barker, Harwell, England, assignor to The National Research Development Corporation, London, England Application September 8, 1952, Serial No. 308,485

11 Claims. (Cl. 324—31)

This invention relates to polarographs of the dropping electrode type. Polarographs usually comprise a cell having a mercury pool electrode and a dropping mercury electrode, and in use a polarizing voltage, that is a direct current potential is applied across the electrodes. The direct current potential may be caused to increase from zero to about 2 volts or decrease from about 2 volts to zero over a space of time up to for example 15 minutes, and current flowing in the cell is recorded against the direct current potential.

Hitherto it has been proposed to apply a small sinusoidal alternating voltage in addition to the normal polarising voltage to the electrodes of a polarographic cell and observe the variation of the amplitude of the resulting alternating current component of the cell current with the mean potential of the dropping mercury electrode. While well defined waves may be produced with solutions containing species that are readily reduced by this method, it shows no appreciable increase in sensitivity over the conventional direct current methods. The low sensitivity of the alternating current method results from a large and variable background current connected with the low A. C. impedance of the double-layer capacity of the dropping mercury electrode, the capacity current obscuring small polarographic waves.

The object of the present invention is to provide a polarograph of the dropping electrode type by which high sensitivity may be obtained.

According to the invention a polarograph comprises means for superimposing on the polarograph cell a varying voltage of substantially square wave form and frequency substantially higher than the dropping frequency, means for monitoring current flowing in the cell associated with electrode action, means for amplifying a voltage proportional to the said current and means for recording or indicating the amplified voltage.

In carrying the invention into effect, the usual polarizing direct current voltage (slowly rising or decreasing with time) is applied to polarograph cell and superimposed upon it is a substantially square wave voltage, which may be for example from 5 to 100 millivolts in amplitude and of a frequency in the neighbourhood of 250 cycles per second. The wave form of the superimposed voltage may be square, i. e. with substantially instantaneous rise and fall of voltage or the rise and fall of voltage may occupy an appreciable portion of the cycle. In either case the intervals during which maximum and minimum voltages are applied may be the same or may differ. During the rise of the superimposed voltage, current in the cell circuit will rise very rapidly owning to the high double layer capacity of the dropping mercury electrode and then decay exponentially to a value (referred to for convenience as "decay value") dependent on the cell diffusion current. In the subsequent fall of the superimposed voltage there will again be a very rapid increase of the current in the reverse direction, owing to the double layer capacity of the system, followed by exponential decay to a value which depends upon the diffusion current. The difference between these decay values is a measure of the change in the diffusion current produced by the applied square wave voltage and the magnitude of this change is governed by the applied direct current potential and the ions present in the solution. In accordance with the invention means to monitor the decay values of the current towards the end of each half cycle of the square wave is provided and a voltage proportional to the differences between consecutive decay values is impressed upon a signal integrator and passes therefrom to a recorder or indicator.

By means of the invention a sensitivity of $10^{-8}$ molar, that is approximately 100 times that of conventional polarographs, may be obtained.

The following are examples of preferred ways of carrying the invention into effect, reference being made to the accompanying drawings which show schematic arrangements in which.

Figure 1:
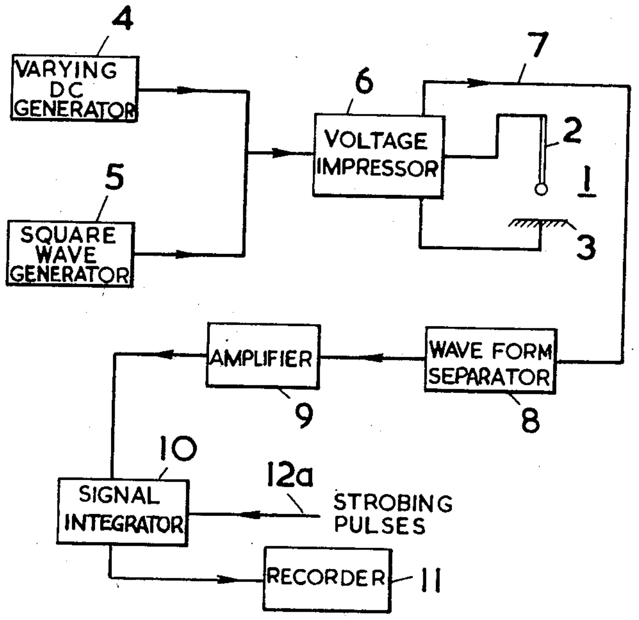
Fig. 1 is a relatively simple form of apparatus requiring a high speed recorder.

In the form of apparatus of Fig. 1 the polarographic cell 1 with dropping electrode 2 and mercury pool electrode 3 is connected to the modulator 6. The output of a generator 5 producing a square wave voltage of a frequency indicated above and that of a slowly varying direct current voltage generator 4 are combined and fed to the modulator 6. A voltage wave proportional to the resultant current wave flowing through the cell is fed by way of 7 to a wave form separator 8, which comprises circuits effective to transmit frequencies equal to or higher than the fundamental frequency of the square wave and attenuate all frequencies below that fundamental frequency. The transmitted wave form is fed to amplifier 9 from which the amplified signals pass to a signal integrator 10. Strobing pulses of double the frequency of the square wave are fed by way of 12*a* to the signal integrator to monitor voltages corresponding to the current decay value differences at each half cycle of the square wave (which decay value differences, as indicated above, are related to the polarographic cell diffusion currents). The monitored voltages then pass to recorder or indicator 11 wherein they are traced against time since the slowly varying direct current potential varies with time, a scale of potentials may be superimposed on the time scale or used in place of a time scale. Since the voltage changes at the input of the recorder are considerable during the period of a single mercury drop, a high speed recorder is necessary to follow faithfully the changes.

Figure 2:
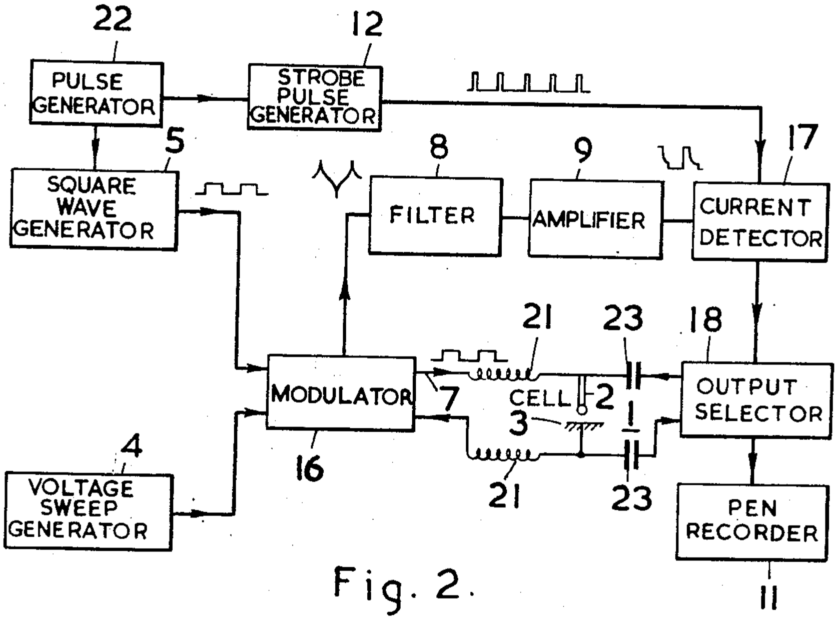
Fig. 2 is a modified form of apparatus which may be employed with an ordinary pen recorder.

In the apparatus shown in Figure 2 use is made of an output selector unit which permits of the use of a relatively inexpensive pen recorder, since the voltage changes are of much smaller magnitude.

Referring now to Fig. 2, a square wave generator 5 produces a square wave voltage with a mark to space ratio of unity and a frequency which is intermediate of two harmonics of the alternating current supply to be employed, for example 225 cycles per second where the supply frequency is 50. The square wave voltage, after appropriate attenuation, is fed into the modulator 16 where it is combined with the slowly changing voltage supplied by the linear voltage sweep generator 4. The output of the modulator should be low, for example 20 ohms. The inductances 21 serve to prevent high frequency currents from the output selector unit 18 from passing to the modulator. The combined voltage is applied to the polarographic cell 1 and the resulting cell current wave form is converted into voltage waveform by passing it through a resistance in the anode circuit of one of the valves in the cell modulator circuit. Low frequency components are removed from the voltage by passage through high pass filter 8 which as indicated in the case of Fig. 1 may comprise a circuit or circuits transmitting substantially, only frequencies equal to or higher than the fundamental frequency of the square wave. The subsequent wave form is amplified in amplifier 9 and passed to current detector 17. This latter circuit monitors the amplitude of the wave form at predetermined time after each change of applied voltage i. e. towards the end of each half cycle and produces a value which is proportional to the difference between the two values observed in a complete cycle of the square wave, i. e. the decay values referred to above. This voltage is smoothed slightly to reduce valve fluctuations caused by valve noise and appears at the output of current detector 17, and is fed to the output selector unit 18. The latter unit contains a condenser C which at a predetermined time after the start of growth of each drop is connected for a period of $2\times10^{-2}$ second to the output voltage of the current detector by means of a high speed relay HSR, and at all other times is isolated as regard leakage of change. During the time it is so connected the condenser C charges up to the value of the output voltage and the voltage across the condenser therefore varies in a stepwise manner from drop to drop. The condenser C is connected through a cathode follower stage CF to the input of a pen recorder 11. Thus a record is obtained of the output voltage only at a definite time in the life of the drop. The condenser C is isolated for practical purposes when the relay is open in view of the high input impedance of the cathode follower CF.

The necessary time delay (1.75 sec.) between the start of growth of a drop and the time at which the output voltage is recorded is obtained by stimulating an electronic delay circuit DC in the output selector 18 each time a drop falls, use being made of the sudden increase in the internal resistance of the cell at that time to obtain the stimulus. A high frequency current (for example 18 mc. s.) alternating current generated by an oscillator OSC is passed through the cell by condensers 23 to detect the impedance change without affecting the behaviour of the system and the burst of high frequency current obtained when the drop falls is rectified by a rectifier REC and used to stimulate the aforesaid delay circuit DC. The delayed stimulus operates to close the high speed relay HSR.

In operating the polarograph described delays between each change in the applied voltage and the time at which amplitude of current is monitored is made a definite fraction of the time interval between successive voltage changes. A fraction of ⅞ has been employed, a figure fixed by the pulse circuits. The pulse generator 22 generates pulses of twice the frequency of the square wave (i. e. 450 C. P. S.) which pulses are fed to the square wave generator 5 and to the strobe pulse generator 12, which latter supplies pulses to the current detector 17 at the said fraction of the time interval of each half cycle of the square wave. The amplitude of the applied square wave may be 4, 12 or 35 millivolts peak to peak.

In ordinary polarography a small cell current, associated with the expansion of the drop surface and known as the residual current, is present. By application of the square wave of the invention this current is modulated and hence contains an A. C. component which varies with time in much the same way as the applied square wave voltage. At a given time after the start of growth of a drop, the amplitude of this additional current component is proportional to the differential double layer capacity of the drop at that time. A compensating cell current may be obtained varying in the appropriate manner with the mean potential of the electrode by using a "square" wave voltage with a very slight downward slope on its upper edge and a corresponding upward slope on its lower edge. In the case of the square wave voltage set out above the desired shape of wave may be obtained by passing it through a condenser resistor coupling of appropriate time constant of the order of two seconds.

Reversible polarographic waves observed by means of the invention resemble those observed on derivative polarograms obtained by other methods but the invention results in a much larger difference between the heights of reversible and irreversible waves, owing to the fact that the application of the square wave makes possible the measurement of the current shortly (that is about $2\times10^{-3}$ second) after each change of applied voltage. If the electrode reaction is reversible, the measure peak to peak amplitude of the current then may be as much as 50 times larger than the corresponding current in the case of a derivative polarograph employing direct current circuits.

A small concentration ($2\times10^{7}$N) of an ion can then be detected in the presence of large concentrations ($10^{-2M}$) of other ions having half wave potentials appreciably more positive than that of the ion in question.

Figure 3:
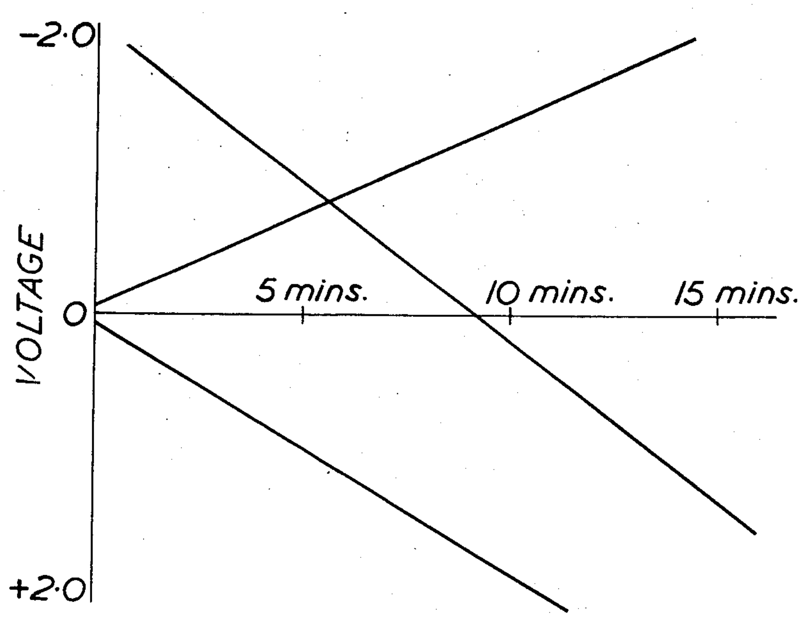
Figs. 3 to 12 show wave forms at the different stages of the apparatus.
Figure 4:
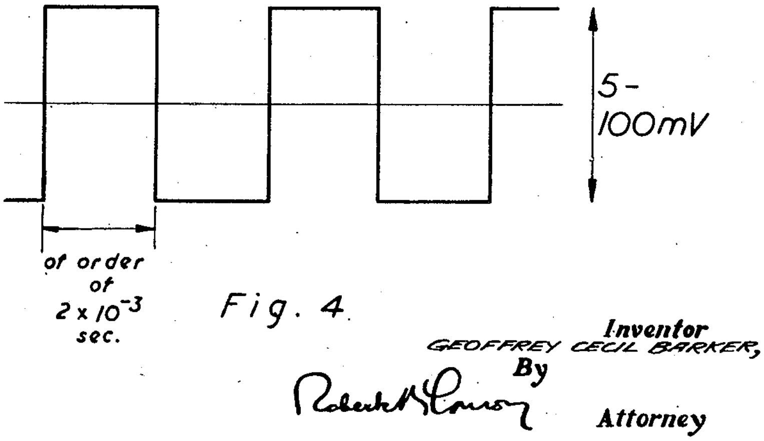
Figure 5:
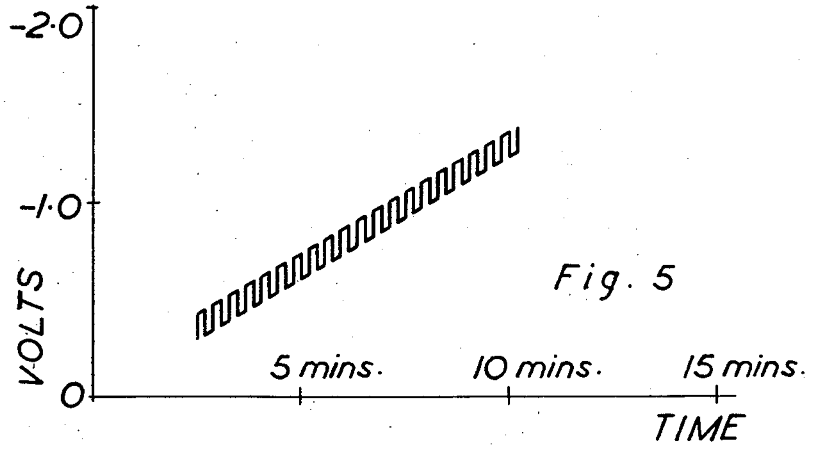
Figures 6, 7:
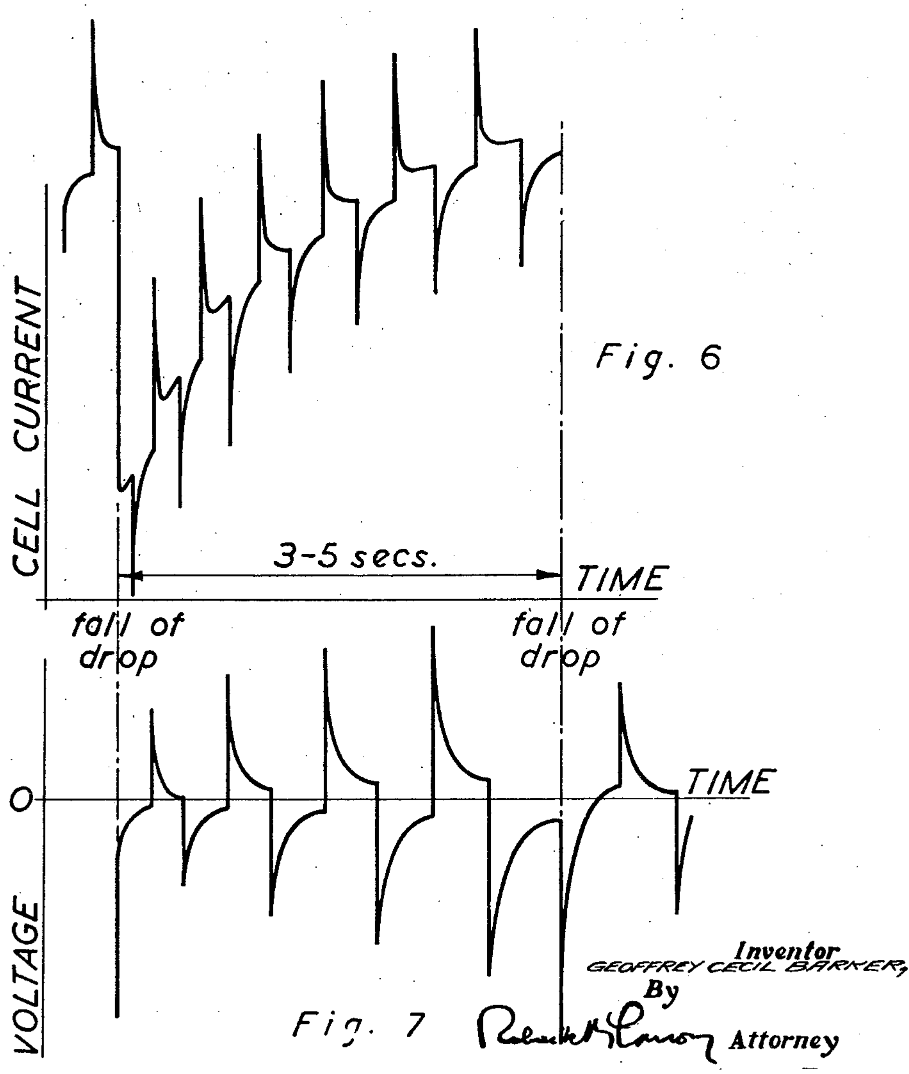
Figures 8, 9:
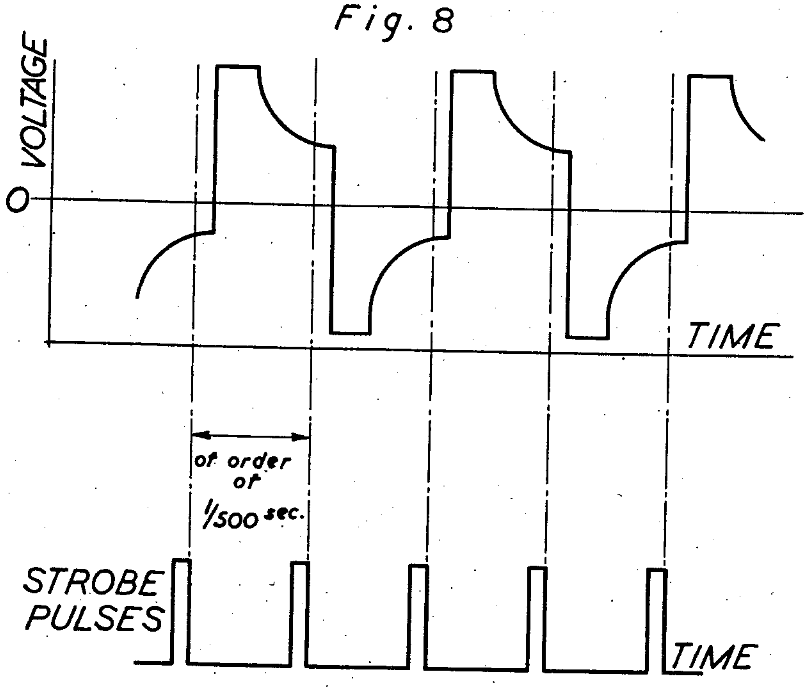
Figure 10:
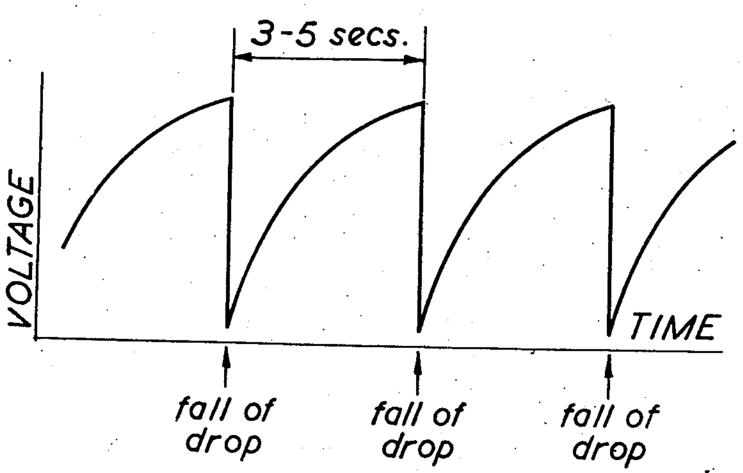
Figure 11:
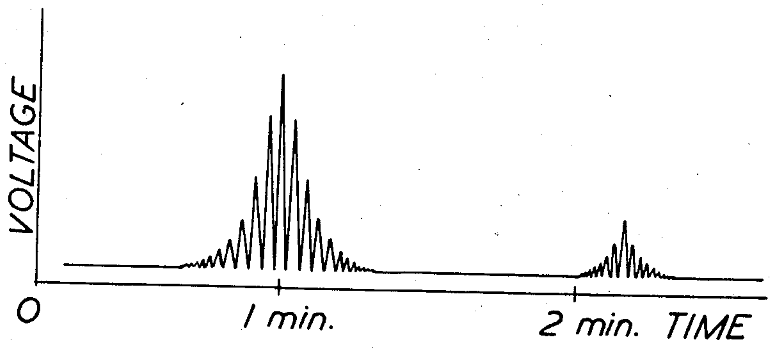
Figure 12:
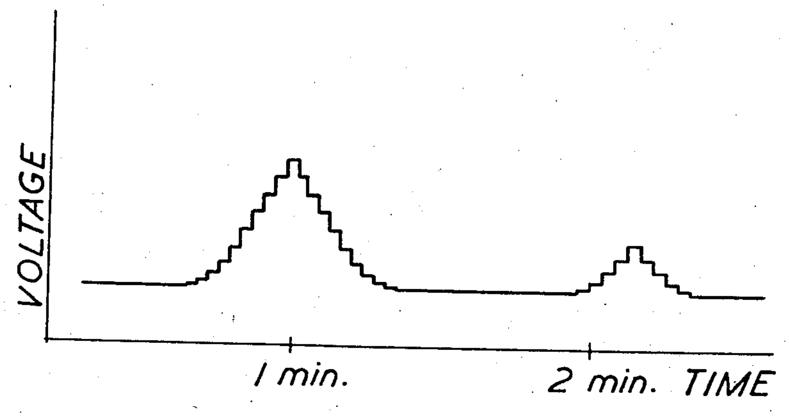

The voltage wave forms at the various stages of the apparatus are illustrated in Figures 3 to 12 of the drawings. In Figure 3 are indicated possible forms of the slowly changing direct current voltage (polarizing voltage) produced by generator 4. The square wave voltage form generated by generator 5 is shown in Figure 4 and Figure 5 shows the combined polarizing voltage (indicated by the rising line of Figure 2) and square wave voltage which is impressed on the cell 1. Figure 6 indicates the cell current wave form between drops, the distance between waves being greatly magnified, and Figure 7 shows the corresponding voltage wave after passing through the wave form separator or filter 8. In Figure 8 is indicated the voltage wave form after passing through the amplifier 8 in the latter part of the life of a drop, and Figure 9 shows the strobing pulses at 12*a* or leaving 12. The wave form of the output of the current detector 17 and integrator 10 is shown in Figure 10 greatly magnified, and Figure 11 indicates the same wave form over a longer period of time. The output of the output selector 18 is shown in Figure 12. In Figs. 5 to 7 the frequency of the wave forms has been greatly reduced in order to make clear their shape, and in Figures 3, 4, 8 to 12, a time scale is indicated.

I claim:

1. A polarograph of the dropping electrode type comprising means for superimposing on the polarographic cell a varying direct current polarizing voltage and a varying voltage of substantially square wave form and a frequency substantially higher than the dropping frequency of the electrode, means for monitoring current flowing in the cell associated with electrode action, means for obtaining a voltage proportional to the said current means for amplifying said voltage and means for displaying the amplified voltage.

2. A polarograph of the dropping electrode type comprising a polarographic cell, means for generating a varying voltage of substantially square wave form and a frequency substantially higher than the dropping frequency of the electrode, means for generating a varying direct current polarizing voltage, means for impressing the combined voltages on the polarographic cell to give rise to a current flow in the said cell, means for obtaining a voltage proportional to the said current means for amplifying said voltage, means for monitoring the voltage towards the end of each half cycle of the square wave and means for recording the monitored voltages.

3. A polarograph according to claim 2 wherein the voltage wave form proportional to current flowing in the polarographic cell is passed through means adapted to transmit frequencies of at least that of the square wave and to attenuate lower frequencies before amplification in the amplifying means.

4. A polarograph comprising a polarographic cell incorporating a dropping mercury electrode and a mercury pool electrode, comprising means for generating a varying direct current polarizing voltage, means for generating a varying voltage of square wave form of a frequency substantially higher than the dropping frequency of the electrode modulating means to combine the said voltages and apply the combined voltage to the electrodes of the polarographic cell and to produce a voltage proportional to current flowing in the said cell in response to the combined voltage, means to attenuate frequencies lower than the square wave frequency in the said voltage proportioned to the cell current while transmitting other frequencies, means to amplify the transmitted frequencies, current detecting means receiving the transmitted frequencies and output selector means which is electrically connected to the output of the detector means at a predetermined time after the start of the growth of each mercury drop for a predetermined period and recording means connected to the output selector, pulse generating means generating pulses at double the frequency of the square wave, the pulse generating means being connected to the square wave generating means and to strobe pulse generator which is connected to the current detector means and serves to monitor the voltage proportioned to the cell diffusion current towards the end of each half cycle of the square wave voltage.

5. In polarographic apparatus comprising a dropping mercury electrode and a mercury pool electrode and means for generating a varying direct current polarizing potential, the provision of means for superimposing on the electrodes a substantially square wave voltage of substantially higher frequency than the dropping frequency of the mercury electrode and means to monitor current flowing in the polarographic cell towards the end of each half cycle of the square wave voltage.

6. Means for operating a polarographic cell comprising means for generating a square wave voltage of frequency substantially greater than the dropping frequency of the cell, means for superimposing the square wave voltage and a varying direct current polarizing voltage on the cell electrodes and means for monitoring current flowing in the cell towards the end of each half cycle of the square wave voltage.

7. Means for use in operating a polarographic cell comprising means for generating a varying direct current polarizing voltage, means for generating a square wave voltage of frequency substantially higher than the dropping frequency of the cell, means for superimposing the square wave voltage and the polarizing voltage on the polarographic cell electrodes, means connected to said superimposing means for monitoring current flowing in the said cell towards the end of each half cycle of the square wave voltage and pulsing means connected to said square wave generating means and to said monitoring means to define the square wave voltage and to serve to control the said monitoring.

8. A polarograph of the dropping electrode type comprising a polarographic cell having a dropping mercury electrode and a mercury pool electrode, means for generating a varying direct current polarizing voltage, means for generating a substantial square wave voltage of frequency substantially higher than the dropping frequency of the mercury electrode, means for impressing the combined voltages on the electrodes of the polarographic cell to give rise to current flowing in the cell, a resistance in series with the cell for deriving a voltage proportional to the said current, means connected across said resistance for attenuating frequencies less than that of the square wave and transmitting frequencies at least equal to that of the square wave, amplifying means for amplifying the transmitted frequencies, monitoring means connected to said amplifying means for monitoring the amplified voltage towards the end of each half cycle of the square wave, a generator of pulses to determine the square wave frequency and a strobe pulse generator for controlling the monitoring means, and a recorder connected to said monitoring means to record the monitored voltages.

9. A polarograph according to claim 7 and having an output selector connected between said monitoring means and said recorder, the said output selector serving to select and pass on signals only during a predetermined portion of the period of drop growth.

10. Means for use in operating a polarographic cell incorporating a dropping mercury electrode and a mercury pool electrode and a varying direct current polarizing voltage generator, the means comprising means for generating a varying voltage of square wave form and frequency substantially higher than the dropping frequency of the mercury electrode, modulating means to combine the square wave voltage and the varying direct current voltage and apply the combined voltage to the electrodes of the polarographic cell and derive a voltage proportional to the current flowing in the cell, means to attenuate frequencies lower than the square wave frequency in the derived voltage and transmit frequencies at least as high as the square wave frequency, means to amplify the transmitted frequencies, current detecting means and output selector means which is electrically connected to the output of the current detecting means at a predetermined time during the growth of each mercury drop, recording means connected to the output selector means, a pulse generator connected to the means for generating the square wave voltage and to a strobe pulse generator which is connected to the current detector to monitor current flowing towards the end of each half cycle of the square wave.

11. A polarograph incorporating a polarographic cell having a dropping mercury electrode and a mercury pool electrode and comprising means for generating a varying voltage of substantially square wave form of frequency substantially higher than the dropping frequency of the mercury electrode, means for producing a varying direct current polarizing voltage, means for impressing the combined voltages on the electrodes of the polarographic cell to give rise to a current flowing in the cell and deriving a voltage proportional to the current, means for attenuating frequencies lower than the square wave frequency in the derived voltage, means for amplifying frequencies not attenuated, a signal integrator means receiving the amplified voltages monitoring the voltage towards the end of each half cycle of the square wave and a recorder connected to the output of the signal integrator means and means supplying strobing pulses to the signal integrator.

References Cited in the file of this patent

UNITED STATES PATENTS

| | | |
|---|---|---|
| 2,246,981 | Matheson et al. | June 24, 1941 |
| 2,267,551 | Cherry | Dec. 23, 1941 |
| 2,666,891 | Weidmann | Jan. 19, 1954 |